United States Patent Office 3,243,672
Patented Mar. 29, 1966

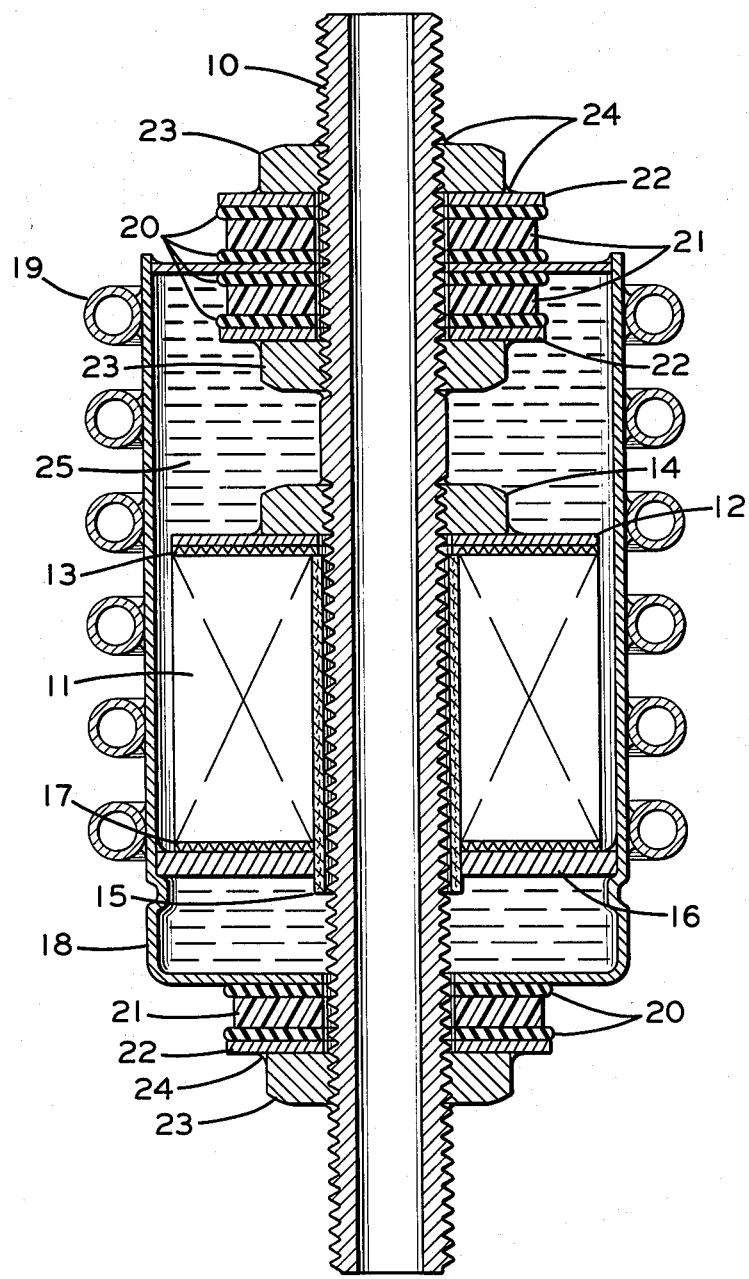
INVENTORS
DAVID H. SIMONDS
GEORGE C. MALLORY
BY
Connolly and Hutz
THEIR ATTORNEYS

3,243,672
FLUID COOLABLE CAPACITOR
David H. Simonds, Williamstown, Mass., and George C. Mallory, Bennington, Vt., assignors to Sprague Electric Company, North Adams, Mass., a corporation of Massachusetts
Filed Jan. 31, 1964, Ser. No. 341,672
3 Claims. (Cl. 317—243)

The present invention relates to a fluid coolable capacitor.

This component is particularly adapted for high R.F. current bypass, coupling and tank circuit applications. Applications of this type produce considerable heat within the unit. A principal feature of the subject capacitor is its adaptation for the dissipation of said heat by internal and external cooling.

The capacitor comprises an internal metal tube which has a convolutely wound, extended copper foil capacitance section positioned thereabout. The extended foils are joined at each end to provide a pair of opposed contact areas. One of the contact areas is connected to the internal tube and the other contact area is noninductively connected to a metal case which hermetically houses said section. The internal tube extends out opposite ends of the case. Said capacitance section is impregnated with and surrounded by a dielectric liquid. An external metal tube is wound about the case. Said internal and external metal tubes are adapted to receive a cooling fluid therethrough.

In the drawing the figure is a side view, in section, of a capacitor within the scope of the invention.

In the drawing an internal brass tube 10 has a convolutely wound, extended copper foil capacitance section 11 positioned thereabout. The capacitance section comprises a feed thru foil and a ground foil separated by kraft paper. The feed thru foil is compression contacted to copper or brass feed thru washer 12 via copper or brass mesh washer 13. Compression is supplied by brass nut 14 which is threaded onto the internal tube. By this arrangement the internal tube becomes a feed thru lead. The ground foil is insulated from the internal tube by a kraft paper jacket 15. The ground foil is compression contacted to copper or brass ground washer 16 via copper or brass mesh washer 17. Washer 16 is noninductively soldered to brass case 18. This means, there is an uninterrupted peripheral solder connection between the washer and the case. An external copper tube 19 is wound about brass case 18. The unit is hermetically sealed by means of rubber washers 20, resin gasket 21, brass washer 22 and brass nut 23. Said nut is soldered to the brass washer at 24. The unit is impregnated with dielectric silicone oil 25.

In operation e.g. for high R.F. current bypass, internal tube 10 and external tube 19 are connected to a cooling liquid source e..g. water. The cooling liquid is then circulated thru and around the unit.

What is claimed is:

1. A capacitor comprising an internal metal tube having a convolutely wound, extended copper foil capacitor section positioned thereabout, the extended foils being joined at each end to provide a pair of opposed contact areas, one of said contact areas being connected to said internal tube and the other contact area being noninductively connected to a metal case which hermetically houses said section, said internal tube extending out opposite ends of said case; said capacitance section being impregnated with and surrounded by a dielectric liquid; an external metal tube wound about said case; said internal and external tubes being adapted to receive a cooling fluid therethrough.

2. The capacitor of claim 1 wherein said internal tube and said case are brass and said external tube is copper.

3. The capacitor of claim 1 wherein said other contact area is noninductively connected to said metal case by means of a metal washer which is soldered to said metal case via an uninterrupted peripheral solder connection.

References Cited by the Examiner
UNITED STATES PATENTS

| | | | |
|---|---|---|---|
| 2,050,587 | 8/1936 | Ruben | 317—260 X |
| 2,492,747 | 12/1949 | Herr | 317—243 X |
| 2,542,841 | 2/1951 | Roberds | 174—15 X |
| 3,024,393 | 3/1962 | Ferrante | 317—242 |

ROBERT K. SCHAEFER, *Primary Examiner.*
JOHN F. BURNS, *Examiner.*
E. GOLDBERG, *Assistant Examiner.*